United States Patent
Brown

(10) Patent No.: US 6,528,120 B2
(45) Date of Patent: Mar. 4, 2003

(54) PROCESS FOR APPLYING A DECORATIVE COATING TO A CONCRETE SURFACE

(76) Inventor: Anthony S Brown, 6429 Sierra Dr., Jacksonville, FL (US) 32244

( * ) Notice: Subject to any disclaimer, the term of this patent is extended or adjusted under 35 U.S.C. 154(b) by 0 days.

(21) Appl. No.: 09/726,098

(22) Filed: Nov. 29, 2000

(65) Prior Publication Data

US 2002/0064637 A1 May 30, 2002

(51) Int. Cl.[7] .................... C04B 41/00; B05D 1/32; B05D 5/00
(52) U.S. Cl. .................... 427/272; 427/270; 427/282
(58) Field of Search .................... 427/256, 258, 427/259, 267, 402, 403, 270, 271, 272, 282; 52/311.1, 315, 316; 118/504

(56) References Cited

U.S. PATENT DOCUMENTS

| 4,539,345 A | * | 9/1985 | Hansen .................... 523/219 |
| 5,243,905 A | * | 9/1993 | Webber .................... 101/112 |
| 5,502,941 A | | 4/1996 | Zember |
| 5,735,094 A | * | 4/1998 | Zember .................... 427/282 |
| 6,090,766 A | * | 7/2000 | Brink .................... 134/3 |

FOREIGN PATENT DOCUMENTS

JP          03197178          1/1993

* cited by examiner

Primary Examiner—Shrive P. Beck
Assistant Examiner—William Phillip Fletcher, III
(74) Attorney, Agent, or Firm—Jeffrey C. Mayward

(57) ABSTRACT

Disclosed are a coated concrete substrate and a process for coating the substrate. The process includes applying a colored polymer-enhanced grout coating and allowing it to cure. A template without adhesive backing is applied over the coating layer. The template is removed after the coating layer is cured. A primer is applied over the coating layer, for providing good cohesive and adhesive properties. A sealer is applied over the cured primer layer, for providing chemical resistance and UV protection. The resulted coated concrete surface is decorative, durable, resilient, stain, chemical resisting, UV protecting, and has the appearance of brick or ceramic tile.

10 Claims, 1 Drawing Sheet

PROCESS FOR APPLYING A DECORATIVE COATING TO A CONCRETE SURFACE

BACKGROUND

Figure 1:
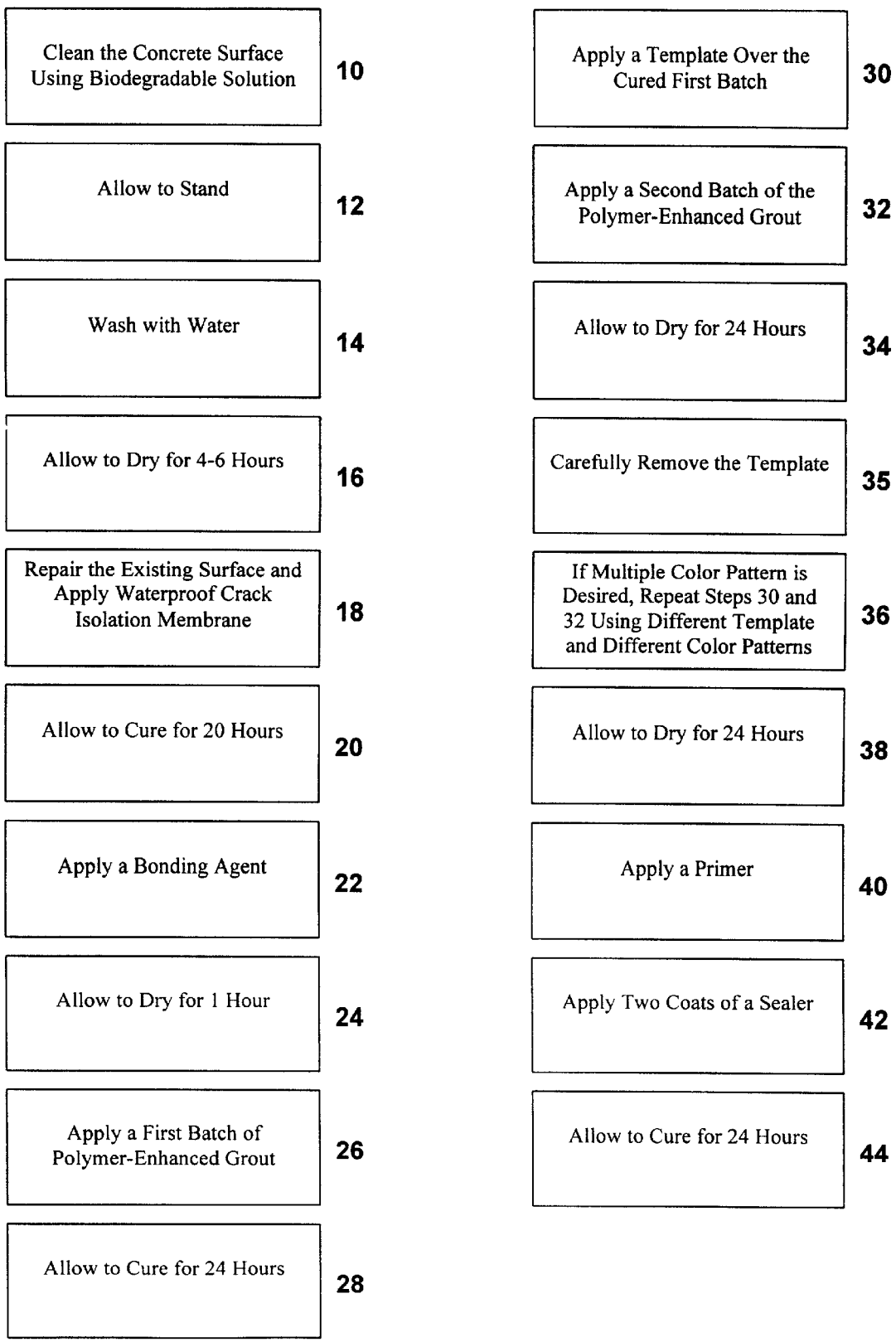

The subject invention relates to a process for coating concrete surfaces with a decorative coating that provides water, chemical, thermal, and UV protection. The decorated concrete surface has the appearance of natural stone or ceramic tile.

A few processes for coloring or ornamenting a concrete surface are known in the art. They range from sweeping partially set concrete to produce a 'broom surface', to adding coloring agents to the cement to produce colored concrete. Colored concrete is often patterned by manually imprinting a pattern into the concrete surface while it is still wet, but solid enough to retain the pattern. More elaborate surface treatments are known, including embedding stones varying in size or color into concrete areas by means of cement or resin.

A known process in the art for ornamenting concrete includes washing a concrete surface with an acidic solution, applying an aqueous solution of cement and polymers to the concrete surface, allowing the solution to cure, laying an ornamental template with adhesive backing on the coated concrete surface, applying a second layer of the cement and polymer solution over the template, and finally removing the template while the coat is still wet. When the template is removed, the portion of the second layer on top of the template is also removed, thereby exposing an ornamental concrete surface.

Another known process involves washing a concrete surface with acidic solution, applying a first layer of polymers to the concrete surface, applying a first layer of an aqueous solution of cement and polymers to the coated concrete surface, applying a template with adhesive backing to selected regions of the first layer of cement and polymers, applying a second cement and polymer layer over the template and the first coating layer, applying colored materials to the second cement and polymer layer prior to the curing of the second layer, and removing the template to expose the colored concrete surface. A sealer may also be applied over the colored concrete surface.

However, these coating processes involve the use of acidic cleaning solutions, which are often harmful to the concrete substrate and the environment. These processes are also deficient in that each batch of coating solution has a different color. Additionally, these coating processes do not create a strong adhesion between the concrete surface and the coating layer. Furthermore, the use of an adhesive backing on the template may create a bond that may prevent the template from being readily removed or may cause the template to tear during its removal. Moreover, removing the template while the coating is wet may cause uncured coating to chip. Finally, the resulting concrete is vulnerable to ultraviolet radiation, humidity, acids, and thermal stress.

Consequently, there exists an unfulfilled need for a concrete coating process that uses an environmentally friendly cleaning solution, provides for color consistency from one coating batch to another, provides for an easily removable template, provides for a strong adhesion between the concrete surface and the coating layer, provides for increased protection from water, UV, chemical, and thermal stress, and results in a decorative, durable, stain-resistant coated concrete surface.

An object of the invention is to provide for a process for coating concrete that results in a decorative resilient surface that has the appearance of natural stone or ceramic tile.

Another object of the invention is to provide for a process for coating concrete that results in a decorative, durable, and stain-resistant coating.

Another object of the invention is to provide for a process for coating concrete that uses materials that cost less than tile or brick.

Another object of the invention is to provide for a concrete coating process that results in a coating layer having a strong adhesion to the concrete surface.

Another object of the invention is to provide for a concrete coating process that employs a template that is easily removable.

Another object of the invention is to provide for a concrete coating process that employs a template without adhesive backing.

Another object of the invention is to provide for a concrete coating surface that uses an environmentally friendly cleaning solution.

Another object of the invention is to provide for a process that uses a bonding agent enabling strong adhesion between the coating layer and the concrete surface.

Another object of the invention is to enable a concrete coating process including a primer that protects against graffiti.

Another object of the invention is to provide for a multi-colored and decorative concrete surface.

Another object of the invention is to provide for a decorated, durable, resilient concrete surface that withstands thermal stress.

Still another object of the invention is to provide for a concrete coating process that employs coating batches of substantially the same color.

An additional object of the invention is to provide for a concrete coating that protects against UV, water and chemical attacks.

SUMMARY

The above-listed objects are met or exceeded by the present invention. The present invention is directed to a process for coating a concrete surface that results in a decorative surface that has the appearance of natural stone or ceramic tile. The process includes cleaning a concrete surface by applying a cleaning solution. A crack isolation membrane is applied to the concrete surface to form a waterproof layer. A polymeric bonding agent is applied to the concrete surface. A first batch of colored polymer-enhanced grout is applied over the substrate surface after curing the polymeric bonding agent. A first ornamental template is laid on the coated substrate, after curing the first coating batch, to create desired patterns on the concrete surface. A second coating batch is applied over the first template and the coated substrate. The first template is removed after curing of the second coating batch, and a colored decorated concrete surface results.

In the cleaning step, environmentally friendly cleaning solutions are used to prevent harm to the concrete surface or the surrounding environment. Furthermore, the use of a polymeric bonding agent creates a strong adhesion between the coating layer and the concrete surface. Additionally, the colored polymer-enhanced grout coatings provide for color consistency from one coating batch to another.

Another advantage of the present process is the use of a template without adhesive backings. Such templates are easily removable and do not create small chips thereafter.

Moreover, the primer used in the present process provides for good adhesion properties as well as high abrasion and thermal resistance. Yet, another advantage is that the sealer used in the present process provides for chemical and sun protection. The final resultant concrete surface provides water, sun, and thermal protection. The resultant concrete surface has the appearance of natural or ceramic tile. Moreover, the ingredients used in the process are less expensive than the cost of real brick or tile.

DRAWINGS

These and other features, aspects and advantages of the present invention will become understood with reference to the following description, appended claims, and accompanying drawing, where FIG. 1 is a block diagram showing the steps of applying applicant's coating process to a substrate.

DETAILED DESCRIPTION

The invention summarized above and defined by the enumerated claims may be better understood by referring to the following detailed description, which should be read in conjunction with the accompanying drawing. This detailed description of a particular preferred embodiment, set out below to enable one to practice the invention, is not intended to limit the enumerated claims, but to serve as a particular example thereof. Those skilled in the art should appreciate that they can readily use the concepts and specific embodiment disclosed as a basis for modifying or designing other methods and systems for carrying out the same purposes of the present invention. Those skilled in the art should realize that such equivalent methods and systems do not depart from the spirit and scope of the invention in its broadest form.

The invention provides for a process for coating a substrate. The coating may be applied over a number of substrates such as wood, metal, concrete and so forth. In a preferred embodiment, the coating is applied over a concrete surface. Referring now to FIG. 1, block 10 represents the step of cleaning the concrete surface using an environmentally friendly solution. The cleaning solution removes the dirt, chalking and stains from the concrete surface, without harming the surface of the concrete or any other contact surface in the surrounding environment. The environmentally friendly cleaning solution is preferably a completely biodegradable solution. A preferable biodegradable solution is Ion-417, available from Chemique, Inc. Ion-47 is 100% biodegradable and is effective over a wide dilution range. Preferably, the cleaning solution works equally well in hot or cold water and does not contain any harsh solvents, phosphates, caustics or acids. The applied biodegradable solution should stand for approximately 10 minutes on the concrete surface, as indicated at block 12 before washing with water 14. The concrete surface should then be allowed to dry for approximately 4 to 6 hours, as indicated at block 16.

Block 18 represents the step of repairing the concrete surface. The cracks are patched and then a waterproof crack isolation membrane is applied. When the membrane is spread on the concrete surface with a tool such as a trowel, it cures and forms a flexible waterproof barrier. A preferable waterproof crack isolation membrane is TEC TripleFlex TA-324, which is available from TEC, Inc. It is a multipurpose elastomeric membrane and consists of acrylic latex additive and cement-based powder. Another preferable waterproof crack isolation membrane is Jamo, which is available from Jamo, Inc. It is a water-based, solvent-free waterproofing membrane. It can be applied using a brush or roller. Block 20 indicates that the waterproof crack isolation membrane should be allowed to cure for approximately 20 hours.

Block 22 represents the step of applying a bonding agent coat for the polymer-enhanced grout base coating. When the membrane is substantially cured, a bonding agent layer is applied using an appropriate tool such as a paint roller. The bonding agent enhances the adhesion of the polymer-enhanced grout base coating to the concrete surface. It also enhances water and chemical resistance of the coating layer. Preferably, used is a polymeric bonding agent such as commercially identified Acryweld-18 bonding agent, which is available from Chemique, Inc. Acryweld-18 is a water dispersion of acrylic polymers. As shown in block 24, the bonding agent layer should be allowed to dry for approximately 1 hour.

Block 26 represents the step of applying a first layer of the polymer-enhanced grout base coating to the concrete surface. The coating layer comprises a colored polymer-enhanced grout. Preferably, the colored polymer-enhanced grout consists of a mixture of polymeric material and sanded tile grout. A preferred polymer is Acryweld-18. The polymer-enhanced grout may be referred to as the Deco-Tech base coating. The polymer-enhanced grout provides water resistance. The grout can be of any desired color. Importantly, the colored grout ensures a uniformity of color from a batch to another, solving a critical problem with the prior art. Additionally, the grout exhibits excellent bonding characteristics. The ratio of polymer to grout in the coating layer is preferably half a gallon of polymer per 25 lbs. of grout. A preferred tile grout is TA-0650 910 Accucolor Sanded Grout, which is available from TEC, Inc. It comprises calcium carbonate (5–10%), silica crystalline (50–70%), Portland cement (10–30%), and titanium dioxide (1–5%). The coating layer is usually applied using an appropriate tool such as a trowel. As shown in block 28, the coating layer should be allowed to cure for approximately 24 hours.

Block 30 refers to the step of applying a template over the cured first coating layer to create desired patterns. The pattern could be a brick pattern, tile flagstone, or any other desired outline. The template may be of several kinds of materials such as plastics, papers and so forth. Preferably, the template has no adhesive backing. In a preferred embodiment, a Teflon (a tetrafluoroethylene polymer available from E. I. du Pont de Nemours & Co.) coated template with no adhesive backing is used. Such template is superior to templates with adhesive backing because it does not create a bond that may prevent the template from being easily removed or cause the template to collapse during removal.

Block 32 shows the step of applying a second layer of the Deco-Tech base coating over the template. The second coating layer preferably includes a substantially higher concentration of polymers than the first coating layer. It includes, preferably, 1 gallon of Acryweld for each 25 lb. bag of grout. Preferably, the second layer includes a different color grout, to achieve a desired effect. The second Deco-Tech base coating is preferably sprayed on using a sprayer that can be adjusted to achieve a desired surface texture. The step at block 34 shows that the coating layer should be allowed to cure for approximately 24 hours.

The first ornamental template is carefully removed after the curing of the second coating batch as referred to in block 35. It is contended that when the template is removed from the cured coating layer, no small chips are likely to be produced and patching would not be needed.

If multiple color patterns are desired, another template with different patterns can be applied over the second coating layer. A third coating layer with different color grout can also be applied over the template as referred to in block 36. A multiple number of desired templates and coating layers can be applied. The resulting layer should be allowed to dry for approximately 24 hours, as shown in block 38.

The next step is applying a primer, as shown in block 40. It is applied using an appropriate tool such as a paint roller. It is contended that the primer has good adhesive, cohesive properties, high abrasion and chemical resistance. An example of such a primer is a water-based urethane dispersion sealer, which is also a graffiti barrier coating. One such primer is commercially identified as CPU-CII, which is available from Chemique, Inc. CPU-CII is a water-based compound. The primer coating should be allowed to cure for 24 hours.

When the surface is cured, a first layer of a sealer is applied as referred to in block 44. It is contended that the sealer provides chemical resistance, UV protection, and a graffiti barrier. An example of such sealer is CPU-647. It is available from Chemique, Inc. CPU-647 is comprised of (Group A) N-Methylene 2-Pyrrolidone and Propylene Glycol Propyl Ether, and (Group B) 1, 6 Hexamethylene Diisocyanate based Polisocyanate, Xylene, and N Butyl Acetate. Another alternative sealer is identified as CPU-66/3, which is also available from Chemique. It is comprised of (Group A) Propylene Glycol Monomethylene Ether Acetate (PMA), Ethyl 3-Ethoxypropionate (EEP), and Xylene, and (Group B) 1, 6 Hexamethylene Diisocyanate, Xylene, and N Butyl Acetate. CPU-647 may be used for indoor surfaces while CPU-66/3 for outdoor concrete surfaces.

When the first layer of sealer is cured after 24 hours, a second layer of the sealer may be applied, as indicated in block 42, and it should be allowed to cure for another 24 hours. It is contended that the final resulting concrete coating is a decorative, durable, resilient concrete surface that has the appearance of natural stone or ceramic tile.

We claim:

1. A process for coating a substrate, comprising the steps of:
   (a) Applying a polymeric bonding agent to the substrate and allowing such bonding agent to dry;
   (b) Applying a first coating batch of a colored polymer-enhanced grout to the substrate, wherein such bonding agent provides a strong bond between the substrate and the first coating batch of colored polymer-enhanced grout;
   (c) Applying an ornamental template to the first polymer-enhanced grout layer;
   (d) Applying a second coating batch of the colored polymer-enhanced grout over the template and the first polymer-enhanced grout layer; and
   (e) Removing the template, wherein a decorative coated substrate is produced.

2. The process according to claim 1, further comprising cleaning the substrate using a biodegradable cleaning solution before applying the polymeric bonding agent to the substrate, such cleaning solution being able to remove dirt, chalk and stains from such substrate without harming the surface of such substrate.

3. The process according to claim 1, wherein a crack isolation membrane is applied to the substrate to form a waterproof barrier before applying the polymeric bonding agent.

4. The process according to claim 1, wherein the ornamental template comprises a template without adhesive backing.

5. The process according to claim 4, wherein the template comprises a tetrafluoroethylene polymer coated template.

6. The process according to claim 1, further comprising the step of applying a sealer after removing the template, wherein the sealer provides protection from chemicals and ultraviolet rays for the colored polymer-enhanced grout coating layer.

7. The process according to claim 6, further comprising the step of applying a primer before applying the sealer, wherein the primer provides high abrasion and chemical resistance to the colored polymer-enhanced grout coating layer.

8. A process for coating a substrate, comprising the steps of:
   (a) Applying a polymeric bonding agent to the substrate and allowing such bonding agent to dry;
   (b) Applying a first coating batch of a colored polymer-enhanced grout to the substrate, wherein such bonding agent provides a strong bond between the substrate and the first coating batch of colored polymer-enhanced grout;
   (c) Applying a first ornamental template to the first polymer-enhanced grout layer, wherein the first ornamental template lacks an adhesive backing;
   (d) Applying a second coating batch of the colored polymer-enhanced grout over the first template and the first polymer-enhanced grout layer; and
   (e) Removing the first template, wherein a decorative coated substrate is produced.

9. The process according to claim 8, wherein the substrate is cleaned using a biodegradable cleaning solution before applying the polymeric bonding agent to the substrate, such cleaning solution being able to remove dirt, chalk and stains from such substrate without harming the surface of such substrate.

10. The process according to claim 8, further comprising:
    (f) Applying a second template over the second polymer-enhanced grout layer;
    (g) Applying a third coating batch of colored polymer-enhanced grout layer over the second template; and
    (h) Removiung the second template after allowing the second and third coating batches to cure.

* * * * *